United States
Saxe

[11] 3,799,650
[45] Mar. 26, 1974

[54] ONE-WAY LIGHT VALVE
[75] Inventor: Robert L. Saxe, New York, N.Y.
[73] Assignee: Research Frontiers Incorporated, Plainview, N.Y.
[22] Filed: Apr. 12, 1972
[21] Appl. No.: 225,499

[52] U.S. Cl. ............................. 350/160 R, 350/291
[51] Int. Cl. ............................ G02f 1/28, G02f 1/36
[58] Field of Search......... 350/160 R, 267, 268, 291

[56] References Cited
UNITED STATES PATENTS
3,203,052  8/1965  Curtis, Jr. ........................... 350/291
3,280,701  10/1966  Donnelly et al................. 350/160 R
3,512,876  5/1970  Marks.............................. 350/160 R

*Primary Examiner*—Ronald L. Wibert
*Attorney, Agent, or Firm*—Stephen E. Feldman

[57] ABSTRACT

A light valve is disclosed in combination with a one-way mirror (a mirror which reflects light in one direction and transmits it in the other direction). The light valve is positioned on the viewing side (the transmitting direction) of the mirror so that the mirror can substantially attenuate the light that is generated on that side of the mirror. The light on the viewing side of the mirror can thus be increased substantially without significantly interfering with the operation of the mirror.

4 Claims, 4 Drawing Figures

PATENTED MAR 26 1974   3,799,650

3,799,650

1

ONE-WAY LIGHT VALVE

BACKGROUND OF THE INVENTION

This invention relates to one-way mirrors, mirrors which act as mirrors when viewed from one side (the reflecting side) and act as windows when viewed from the other side (the viewing side). The latter side receives light transmitted from the reflecting side. At present, one-way mirrors are not in wide commercial use, the main reason being that in order for a conventional one-way mirror to be effective, the light on the viewing side of the mirror, the side which receives the light transmitted from the other side (the reflecting side of the mirror), must be kept at a very low light level. If the level of light on the viewing side in increased above a very low level, the mirror will transmit light in both directions and will be totally useless for its one-way purpose.

One area where these mirrors are commonly used is in psychological testing activity. There, patients are on the reflecting side of the mirror and the psychologist is on the viewing side of the mirror. The psychologist can then see the activity of the patients while the patients will only see their own reflected images. However, the problem is that at present the light level in the psychologist's area, the viewing area, must be kept so low that it is very difficult to write or perform any functions in that area. If the light level is increased too much, the mirror will become transmissive in both directions and then the patients will be able to see the psychologists and destroy the purpose of the experiment. One-way mirrors, can, of course, be used any place that one wishes to observe people, animals or any other things and enable the observer to be unobserved by the things being watched. Thus, one-way mirrors, if improved in capability, could find wider use in places such as banks, hospitals, biological or other laboratories, secret installations, offices, etc.

An object of this invention, therefore, is to provide a one-way mirror which permits light to be increased substantially in the viewing area, (above light levels practical for conventional one-way mirrors), without affecting the one-way function of the mirror.

Another object is to increase the commercial use and capabilities of one-way mirrors.

Still another object is to control the amount of light attenuated from the viewing side to enable an observer to see through the one-way mirror regardless of what light level exists on the viewing side.

SUMMARY OF THE INVENTION

A combination one-way mirror and light valve is provided. The light valve is positioned on the viewing side of the mirror to controllably attenuate the light generated on that side of the mirror so that very little light from that side of the mirror will strike the mirror and interfere with its operation. This permits a much brighter light source to be used on the viewing side of the mirror without interfering with its function or operation.

PREFERRED EMBODIMENT OF THE INVENTION

Figure 1:
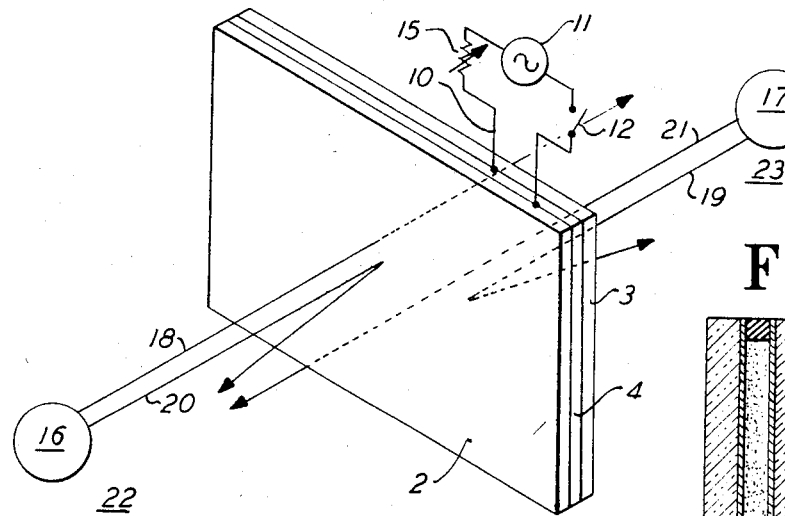
FIG. 1 illustrates a perspective view of the combination light valve and one-way mirror of this invention.
Figure 2:
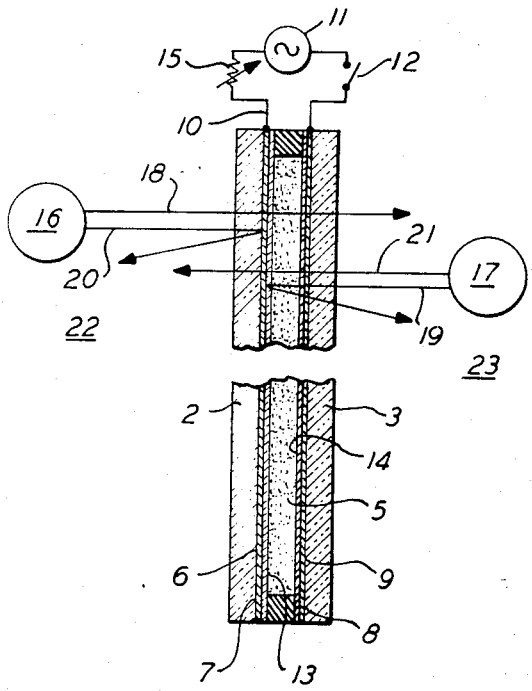
FIG. 2 is a cross-sectional view taken along line 2—2 of FIG. 1 illustrating the effect of the one-way mirror on the light sources.

In FIGS. 1 and 2 are shown a one-way mirror light valve construction of this invention. The construction consists of two transparent plates, 2 and 3, spaced a small fraction of an inch apart, which are preferably constructed of plastic, glass or other strong transparent material. These plates are preferably parallel or substantially parallel and, together with a fluid suspension placed in the space between them, the plates are sealed around the periphery by sealants as indicated by 4 to create an enclosed cell 5. The sealants should be ones that are non-reactive with the mirror or the light valve or the fluid suspensions used in the light valve.

The inner surface 6 of plate 2 is coated with mirror quality silvering 7 to create a reflecting surface. The amount of silvering is the same amount as generally applied to one-way mirrors, that is, an amount which is sufficient enough to form a reflective surface but is thin enough so that it is transparent when viewed from the viewing side of the mirror. The other plate, plate 3, is coated on its inner surface 8 with a thin, transparent electrically conductive coating 9. This coating can be the same transparent coating conventionally used on light valves as a conductive surface for the purposes hereinafter stated. The mirror coating 7 is also conductive so that when the two coatings are electrically connected by suitable wiring 10 to a source of voltage 11, such as the AC voltage source shown in FIG. 2, an electric field will exist between the coatings and across the fluid suspension. A switch 12 is provided in the circuit to connect and disconnect the voltage source 11, and/or enable one to controllably vary the voltage. To protect the silvered electrode, or both electrodes from degradation by a suspension, one can apply a thin overcoating of silicon monoxide or other suitable inert material, without materially affecting the operation of this invention. Thin, transparent coatings 13 can be provided to protect the mirror coating 7 and transparent coating 9 from the inside of the cell. Once the cell is completely constructed, it is filled with a fluid suspension. The fluid suspension comprises any of the conventional fluid suspensions used or useable in light valves.

The suspended particles in these suspensions are such that they can have their orientation changed when an electric or magnetic field is applied to the suspension. By the term change in orientation is meant that the particles change their position relative to each other when a field is applied. A typical suspension which is used in light valves consists of particles of herapathite suspended in a carrier such as isopentyl acetate. The particles of herapathite are long, thin needle-shaped particles and are normally (with no voltage applied) disoriented, that is, their axes are not aligned. However, when a voltage is applied, the particles become aligned so that their long axes are paralled to each other and to the direction of the field. This places the long axes of the particles perpendicular to the walls of the cell and thereby parallel to the direction of viewing. In that position, their smallest dimension (the point of the needle) will be the only impediment in the direction of viewing. This will be such an insignificant impediment that the suspension will appear transparent.

However, without the voltage field applied, the particles will be randomly oriented, due to Brownian Motion. This will cause the suspension to appear very dark and very little radiation will be able to pass therethrough. In between the dark and light stages intermediate stages of transparency or darkening between these extremes can be achieved. These intermediate positions can be achieved by controlling the voltage field. In the intermediate stages, some, but a less than maximum number of the particles are aligned.

Other substances can be used for the fluid suspension as long as they contain particles which can have their orientation changed on the application of an electric or magnetic field and will permit one to see an image through the suspension, and provided also that the carrier fluid is one that does not interfere with the functioning of the suspended particles.

A variable resistor or other control device 15 is also placed in the circuit to control the amount of voltage and thereby control the strength of the voltage field. As aforementioned, the strength of the field will determine the percentage of particles that are properly aligned and thereby control the amount of transparency of the suspension.

In operation, a light source 16 would be placed on the reflective side of the mirror and another light source 17 would be placed on the viewing side of the mirror.

At present, the light source on the reflecting side 16 must be many times the strength of the light source on the viewing side 17, and in fact, in most cases, the light source on the viewing side 17 must be extremely small to avoid having this light reflect off the mirror and interfere with the proper operation of this mirror. The normal functioning of a one-way mirror is such that the viewing side of the mirror is kept in darkness, and the other side, the reflecting side, is kept in bright light. The light on the reflecting side will reflect off the mirror so that a person standing on that side can only see his own image, whereas, the light on the viewing side is so slight that a person standing on that side can see right through the mirror. As the light increases on the dark side of the mirror it gets to the point where both sides, the dark and light side, have equal or close to equal light illumination. At that point the mirror becomes transmissive in both directions and persons on both sides will be able to see each other through the mirror. The result will then be to destroy the effect of the one-way mirror.

However, with this invention, because a light valve is combined with a one way mirror, the light source on the viewing side, light source 17, can be substantially increased without a person on the reflecting side being able to see someone on the viewing side, that is, the side of light source 16.

The operation of the mirror light valve is as follows. The light rays generated by light sources 16 and 17, act in two ways. Some of them reflect off the surface of the mirror (reflective rays) and some of them pass through the mirror (transmitted rays). The transmitted rays 18, generated by light source 16, will pass directly through the one way mirror in the conventional manner and will pass through the suspension and be viewed in the viewing area 19. The voltage across the suspension is adjusted so that the suspension has very little effect on these rays. The reflective rays, generated by light source 16, also will be reflected off the one way mirror as shown by ray 20 in the normal manner.

On the other hand, the transmitted light rays generated by light source 17, will travel through the suspension and through the one-way mirror and when they emerge and have to compete with the much stronger reflective rays 20 of light source 16, which do not pass through the suspension, they will be eliminated since they will be invisible to a person in area 22. In other words, some rays of light source 17, the transmitted rays, will pass entirely through the cell and the mirror, but by the time they enter into area 22, the reflective area, they will be so weak in proportion to reflective rays 20 of light source 16, they will be negligible and will not be able to be seen.

The other light rays generated from light source 17, the reflective rays, such as ray 23, will pass through the suspension twice, once directly, to reach the mirror and then a second time after reflecting off mirror surface 7. These rays having travelled twice through the suspension, will also be so much weaker than rays 18 transmitted directly from source 16, that they will be relatively negligible compared to rays 18. This is because rays 18 only pass through the suspension once, whereas rays 23 pass through the suspension twice. The reflective and transmitted rays from light source 17 will thereby be so substantially weakened when compared to the reflected and transmitted rays from light source 16, that they will be negligible. The transmitted and reflective rays from source 16 will be the only ones that can be seen. Both the transmitted and reflective rays from light source 17 pass through the suspension once more than the corresponding rays from light source 16, thus light source 17 can be quite strong without interfering with the effective operation of the one-way mirror. It can even be about equal in intensity to light source 16 without any adverse effect. Therefore, a person standing at 22 in the reflective area will see substantially only those rays 20 generated from within his own area and being reflected from mirror 7. Whereas, a person standing in area 19 will have the benefit of light source 17 so that he can effectively operate in area 19 and will also be able to see the light emanating from light source 16, in the other area.

As aforementioned, it is particularly important that the light valve be adjustable so that the transmitted and reflective rays from light source 16 be permitted to predominate and the rays from light source 17 be attenuated to the point where they are insignificant. The control over the amount of light transmission through the suspension will have to be adjusted depending on the lighting conditions on each side of the mirror, but one can also control ambient lighting conditions to help achieve the desired results. The light valve should be adjustable so that there is a way to compensate for different or varying lighting conditions in both of the areas and so that the relative balancing of the light rays can be accomplished to yield the desired results. Once can also select the concentration of material suspended in the fluid suspension so as to predetermine how dark and/or clear the suspension can be made.

Thus, in the problem aforementioned, a psychologist could effectively operate under a fairly bright lighting conditions in area 19 and see a patient in area 20 without the patient observing the psychologist.

It will be appreciated that although light sources 16 and 17 are shown as point sources for convenience, actually the light generated in either area could be all the light in the area and not just the light emitted from a single light source.

Figure 3:
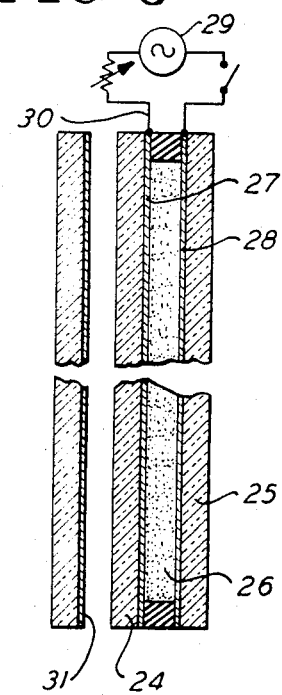
FIG. 3 is the cross-sectional view of an alternative mode of the invention.

FIG. 3 illustrates an alternative mode of the invention. In this case, the one-way mirror has been completely separated from the light valve. The light valve consists of two transparent sections, 24 and 25, a cell 26, two transparent conductive coatings 27 and 28, a voltage source 29, and suitable wiring 30. The light valve acts in the same manner as mentioned with regard to FIGS. 1 and 2, except that now the one-way mirror 31 with its reflective coating (silvering) is completely separated from the light valve. The operation of the entire mechanism is exactly the same as before except now the one-way mirror can be removed from the rest of the light valve if desired.

Figure 4:
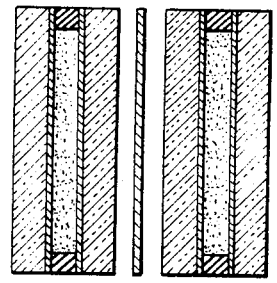
FIG. 4 is a cross-sectional view of another alternative mode of the invention.

FIG. 4 illustrates a one-way mirror with a light valve on both sides of the one-way mirror. The device will operate in the same way as the device of FIGS. 1 and 2, but can be operated from either side so as to provide a greater degree of flexibility.

It will be appreciated that the cell can contain a dark fluid instead of a fluid suspension. The dark fluid, in the conventional manner with dark fluid cells, is pumped between a reservoir and the interior of the cell to produce the transparent and opaque conditions. The dark cell, however, does not have the fine range of control nor the quick responsiveness that the fluid suspension light valve does.

The term fluids includes fluids and fluid suspensions.

The outer surface of plate 3 (that surface closest to light source 17) may be coated with an anti-reflection coating such as a layer of magnesium flouride. This coating acts as an anti-glare agent to prevent any light from light source 17 from reflecting off the outer surface of plate 3 and somewhat interfering with the proper viewing from area 23.

It will thus be appreciated that this invention provides a highly efficient way of effectively increasing the radiation on the dark, viewing area, side of a one-way mirror.

While specific embodiments of the invention have been illustrated, it will be appreciated that this invention is not limited thereto as many modifications may be made by one skilled in the art which falls within the true spirit and scope of the invention.

I claim:

1. A one-way mirror light valve including a cell for containing a fluid suspension of colloidal particles dispersed therein capable of having their orientation changed by an electric or magnetic field to change the transmission of light through the suspension, said cell having first and second wall sections spaced apart a distance which is small compared to the lateral dimensions of the sections, and means for applying an electric or magnetic field to the suspension between said wall sections to change the light transmission thereof, said first wall having a transparent reflective and conductive coating thereon, and said second wall having a transparent conductive coating thereon, said reflective coating being a partially reflective mirror and wherein light incident on the second wall in passing through the fluid suspension is rendered substantially less intense and non-visible proximate the first wall when compared to the intensity of the light incident on the first wall that is reflected from the mirror without passing through the fluid suspension and wherein light incident on the second wall that is reflected by the mirror and thereby through the fluid suspension twice is rendered substantially less intense and non visible proximate the second wall when compared to the light incident on the first wall which passes through the fluid suspension only once and means to vary the intensity of the electric or magnetic field to control the light transmission and thereby control the intensity of the light passing through the fluid suspension.

2. A one-way mirror light valve including a cell for containing a fluid suspension of colloidal particles dispersed therein capable of having their orientation changed by an electric or magnetic field to change the transmission of light through the suspension, said cell having first and second wall sections spaced apart a distance which is small compared to the lateral dimensions of the sections, and means for applying an electric or magnetic field to the suspension between said wall sections to change the light transmission thereof, said first wall having a transparent conductive coating thereon, and said second wall having a transparent conductive coating thereon, a reflective mirror, having first and second sides positioned proximate said first wall with said first side facing toward said first wall and said second side facing away from said first wall, said reflective mirror being a partially reflective mirror and wherein light incident on the second wall in passing through the fluid suspension is rendered substantially less intense and non-visible proximate the second side of the mirror when compared to the intensity of the light incident on the second side of the mirror that is reflected from the mirror without passing through the fluid suspension and wherein light incident on the second wall that is reflected by the mirror and thereby passes through the fluid suspension twice is rendered substantially less intense and non-visible proximate the second wall when compared to the light incident on the second side of the mirror which passes through the fluid suspension only once to reach the area proximate the second wall and means to vary the intensity of the electric or magnetic field to control the light transmission and thereby control the intensity of the light passing through the fluid suspension.

3. The one-way mirror light valve of claim 2 including a second cell for containing a fluid suspension substantially identical to said first mentioned cell and positioned on the other side of said mirror from said first mentioned cell and wherein a second means for applying an electric or magnetic field to this suspension is provided which is substantially identical to said first mentioned means for applying an electric or magnetic field to the suspension.

4. The one-way mirror light valve of claim 2 wherein the fluid suspension is a suspension of herapathite.

* * * * *

UNITED STATES PATENT OFFICE
CERTIFICATE OF CORRECTION

Patent No. 3,799,650              Dated March 26, 1974

Inventor(s) Robert L. Saxe

It is certified that error appears in the above-identified patent and that said Letters Patent are hereby corrected as shown below:

Column 3, line 66 "19" should read --23--.

Column 4, line 18, "23" should read --19--.

Signed and sealed this 10th day of June 1975.

(SEAL)
Attest:

RUTH C. MASON
Attesting Officer

C. MARSHALL DANN
Commissioner of Patents
and Trademarks

UNITED STATES PATENT AND TRADEMARK OFFICE
CERTIFICATE OF CORRECTION

PATENT NO. : 3,799,650
DATED : March 26, 1974
INVENTOR(S) : ROBERT L. SAXE

It is certified that error appears in the above—identified patent and that said Letters Patent are hereby corrected as shown below:

Column 4, line 43, change "19" to --23--.

line 44, change "19" to --23--.

line 66, change "19" to --23-- and change "20" to --22--.

Signed and Sealed this

Sixth Day of February 1979

[SEAL]

Attest:

RUTH C. MASON
Attesting Officer

DONALD W. BANNER
Commissioner of Patents and Trademarks